United States Patent [19]

Schneider

[11] Patent Number: 4,670,051

[45] Date of Patent: Jun. 2, 1987

[54] OXIDATION PROCESS FOR RELEASING METAL VALUES IN WHICH NITRIC ACID IS REGENERATED IN SITU

[75] Inventor: John C. Schneider, Acton, Canada

[73] Assignee: Hydrochem Developments Ltd., Brampton, Canada

[21] Appl. No.: 713,752

[22] Filed: Mar. 19, 1985

[51] Int. Cl.$^4$ .............................................. C22B 3/00
[52] U.S. Cl. .................... 75/101 R; 75/117; 75/118 R; 75/119; 75/120; 75/121
[58] Field of Search ................. 75/101, 117, 118, 119, 75/120, 121, 118 R, 101 R; 423/27, 32, 56, 109, 143, 150

[56] References Cited

U.S. PATENT DOCUMENTS

| | | | |
|---|---|---|---|
| 3,966,462 | 6/1976 | Posel et al. ...................... | 75/101 R |
| 3,992,270 | 11/1976 | Lemarinel et al. ............... | 75/101 R |
| 4,132,758 | 1/1979 | Frankiewicz et al. ............. | 423/109 |
| 4,250,149 | 2/1981 | Welsh ................................ | 423/27 |
| 4,361,541 | 11/1982 | Bings et al. ....................... | 75/101 R |

Primary Examiner—Melvyn J. Andrews
Attorney, Agent, or Firm—Ridout & Maybee

[57] ABSTRACT

An oxidation process for releasing a metal of interest in an ore is described. The process is especially useful for releasing a metal of interest entrapped in a refractory ore. The process comprises reacting the ore with nitric acid until sufficient oxidation has occurred to release the metal of interest so that it may be recovered by conventional techniques. Nitric acid is regenerated in situ by aerating the liquid medium and contacting it with the off gases generated by the oxidation. The process is continuous and the nitric acid is recycled to the reactor preferably after removal of accumulated sulfate and dissolved metal cations.

28 Claims, 7 Drawing Figures

OXIDATION PROCESS FOR RELEASING METAL VALUES IN WHICH NITRIC ACID IS REGENERATED IN SITU

This invention relates to a method for chemically treating ores so that the metals of interest may be recovered therefrom. The invention particularly relates to a method for treating refractory ores so that a metal of interest may be recovered therefrom. The method may be used to recover such metals of interest as gold, silver, cobalt, nickel, copper, zinc, uranium, tungsten, and molybdenum as well as others.

A refractory ore may generally be defined as an ore which requires an oxidative pretreatment such as roasting prior to processing for extraction of the metal of interest. In the gold and silver industry, such gold or silver bearing refractory ores most commonly are the arsenical ores such as arsenopyrite, and ores containing antimony. The arsenopyrite ores usually contain substantial amounts of pyrite and lesser amounts of minerals containing antimony, zinc, copper, selenium, tellurium and other metals. While gold and silver comprise a commercially attractive constituent of these ores, the gold and silver cannot be leached by conventional cyanide processes because they are bound within the structure or inhibited by the chemical makeup of the refractory ore. It has been understood for some time that the key to releasing the gold and silver in these refractory ores is to oxidize the ore, thus modifying its existing structure.

Oxidation of an arsenopyrite or other sulfidic ore may be carried out by roasting the ore in the presence of air or oxygen. Since these ores are sulfidic, a large amount of sulfur dioxide is produced. Arsenic compounds, such as arsenic oxides, are also released upon roasting of an arsenopyrite ore. Thus, the environmental impact from roasting a refractory ore is such that costly systems for dealing with the hazardous by-products must be installed. Also, the presence of antimony in a refractory ore has been noted to have a deleterious effect.

Other methods for oxidatively treating refractory ores involve oxidizing the crushed ore, usually in a slurry, in the presence of oxygen at elevated pressure and temperature. These methods require the use of a pressure autoclave which is a costly apparatus to install and operate. Exotic alloys are required in construction, and silver is not released consistently by these processes.

The present invention overcomes many of the disadvantages of known oxidation processes for refractory ores and other ores by providing a continuous process which may be performed at atmospheric pressure wherein no deleterious gases are released to the atmosphere and the tailings may be disposed of in a safe and economical fashion. Oxidation of ores in accordance with the invention involves the treatment of the crushed ore in a slurry of nitric acid. Sulfide, which in the context of this disclosure and claims includes disulfide and other polysulfide anions, is oxidized by the nitric acid at least to elemental sulfur and including those higher oxidation species up to sulfate. Arsenic, antimony, iron, zinc, copper and other metallic constituents of the ore may be solubilized and oxidized depending on the oxidation conditions.

The process incorporates the in situ regeneration of nitric acid from the nitrogen oxide reaction products of the ore treatment. Thus, the process does not consume uneconomically large quantities of nitric acid, but requires only a steady input of lime, principally to precipitate sulfate formed as gypsum. Where carbonate is present in the ore, lime requirements are reduced.

The process is energy efficient, requiring circulation means for fluids and motors for agitators used therein. Considerable heat is generated at various stages of the process which may be tapped for use in operating the plant. While the process employs nitric acid, the use of stainless steel is usually suitable for the construction of the equipment needed to carry out the process.

Because the oxidation power of nitric acid is dependent on its concentration and the operating temperature and pressure of the reactor, the emf of the process can be controlled to effect selective oxidation of various species comprising the ore. This control inherent in the process affords it great flexibility, and thus, may be suitably employed in a wide range of ore treatment applications.

The process does not require the installation of expensive equipment or equipment made of exotic alloys. Rather, the process makes use of the superior gas/liquid contacting provided by surface agitation of the liquid phase in the preferred manner hereinafter described and claimed to obtain a highly efficient regeneration of nitric acid within the reaction vessel.

Accordingly, the invention provides a process for oxidizing an ore, comprising: supplying crushed ore to a covered reaction vessel in which the ore is suspended as a slurry in aqueous nitric acid in the presence of oxygen until the ore is sufficiently oxidized to enable the recovery of the metal of interest by conventional means; and continuously introducing oxygen into the reaction vessel and exhausting gas therefrom while continuously contacting the aqueous reaction medium in the vessel as a discontinuous phase in the nitrogen oxides containing gas flowing therethrough, thereby regenerating nitric acid.

The invention also provides a process for oxidizing an ore, comprising: continuously introducing the crushed ore and aqueous nitric acid into a first end of a covered reaction vessel, and continuously introducing oxygen into the removing gas from said vessel in which the ore is suspended as a slurry in the aqueous nitric acid in the presence of oxygen, said vessel having a plurality of partitions spaced from one another defining a plurality of cells within the vessel, said partitions having apertures therein providing a pathway for the flow of the gas and slurry phases through the vessel, and each said cell having means for agitating the slurry; continuously agitating the slurry in each cell to maintain the ore particles in suspension in the aqueous acid and to provide a discontinuous phase in the nitrogen oxides containing gas flowing therethrough thereby regenerating nitric acid; causing the slurry and gas phases to flow through the reaction vessel from cell to cell at rates which allow the ore to be sufficiently oxidized to enable the recovery of the metal of interest by conventional means; and continuously removing slurry from a second end of the vessel.

The preferred embodiment hereinafter described relates specifically to the oxidation of a gold and silver containing sulfidic, refractory ore for the purpose of freeing the gold and silver trapped therein so that they may be recovered by conventional chemical leaching techniques. It should be appreciated by those skilled in this art that the process of the invention has wide application to the oxidative processing of ores generally. To this end the various process steps and reagents may be modified to suit the particular application in a manner which should be apparent to the skilled person.

The preferred embodiment will be described with reference to an ore referred to as arsenopyrite. It should be understood that the designation arsenopyrite is not meant in the narrow sense of FeAsS, but rather pertains to a mineral mixture of which FeAsS is the major component. As mentioned above, such arsenopyrite ores may also contain pyrite ($FeS_2$), chalcopyrite ($CuFeS_2$) and sulfides, oxides or salts or any of a wide variety of metals including copper, zinc, antimony or bismuth.

A preferred embodiment of the invention will be described with reference to the drawings in which.

Figure 1:
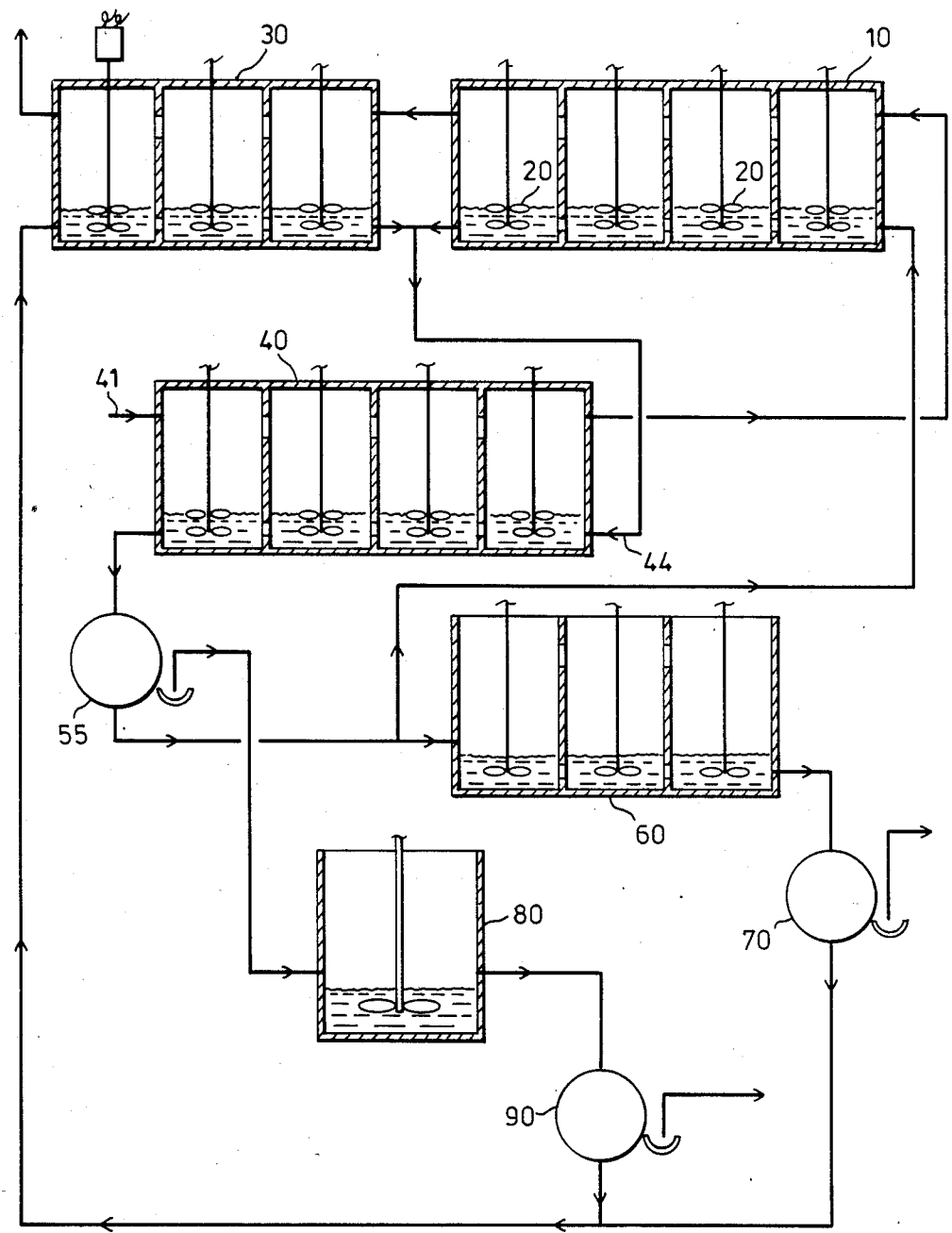
FIG. 1 is a schematic representation of the overall process.

The overall process is schematically shown in FIG. 1. Crushed ore is fed into one end of a continuous reactor 10 which contains nitric acid in water. The actual molarity of the nitric acid in the reactor will depend on the process requirements for the particular ore being oxidized, including the water balance parameters for the initial stages. Generally, with an arsenopyrite ore the reactor 10 will be charged with about 1M nitric acid (about 6.5% by weight) and this initial concentration stays about the same throughout the reactor 10 due to the continuous regeneration of nitric acid within the reactor 10 as described below.

There are a number of chemical reactions which operate concurrently in the reactor 10. Principally, a sufficient amount of the sulfur component of the arsenopyrite ore, existing initially as sulfide ($S^{-2}$) or polysulfide, is oxidized at least to elemental sulfur to release the metal of interest from the structure of the ore. This oxidation is accompanied by the reduction of nitrate to nitrogen dioxide and nitrogen oxide. The major reactions in this regard may be written as follows:

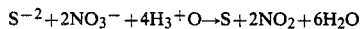

$S^{-2} + 2NO_3^- + 4H_3^+O \rightarrow S + 2NO_2 + 6H_2O$

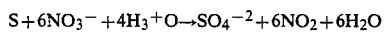

$S + 6NO_3^- + 4H_3^+O \rightarrow SO_4^{-2} + 6NO_2 + 6H_2O$

Probably to a lesser extent, the following reactions are occurring:

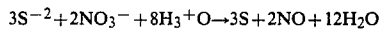

$3S^{-2} + 2NO_3^- + 8H_3^+O \rightarrow 3S + 2NO + 12H_2O$

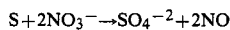

$S + 2NO_3^- \rightarrow SO_4^{-2} + 2NO$

These reactions are, of course artificial representations of what is actually going on in the reactor 10, but serve to isolate those species involved in the oxidation of sulfide and sulfur. The oxidation of sulfide causes the release of its associated metallic cations into solution where depending on the oxidation potential they may also be oxidized by the nitric acid.

It should be emphasized at this point that it may not be necessary to oxidize all of the sulfides present in the refractory ore to effect the release of gold or other metal of interest from the structure of the ore in which it is entrapped. For example, an ore comprising arsenopyrite and pyrite may release the gold and silver trapped therein upon oxidation of the arsenopyrite sulfide portion while leaving the pyrite essentially unoxidized. This selective oxidation can be accomplished by controlling the emf of the oxidation through the nitric acid concentration and the temperature in the reactor 10. The arsenopyrite sulfide is oxidized at a lower emf than is the pyrite sulfide, thus, controlling the oxidation conditions in this manner provides a more efficient process than would be the case if harsher oxidation conditions were used. Clearly, each ore refining situation will have its own peculiar requirements for effecting the most complete recovery of the metal of interest, and it should be understood from the foregoing that oxidation of all sulfidic species comprised within the ore may not be necessary to optimize recovery. The oxidation of the ore is an exothermic process, and it has been found that the heat of reaction can be used to operate the reactor 10 at up to about 80° C. The optimum temperature will vary with the particular requirements of each ore.

Large amounts of nitric acid are consumed in this oxidation process; up to 8 moles $HNO_3$ per mole of sulfide. In order to make the process economically attractive, the nitrogen oxides generated in the oxidation must be reoxidized to nitric acid for use within the reactor.

The nitric acid cycle employed by the invention may be written as follow:

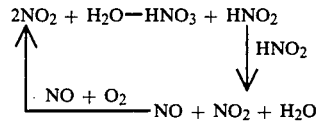

The regeneration of nitric acid from $NO_2$ and NO requires oxygen and water. The reactor 10 is connected to other vessels used to carry out the process but is closed to the surrounding atmosphere. Air is circulated preferably concurrently with the flow of slurry through the reactor 10 at a sufficient rate to provide a constantly renewing supply of oxygen for oxidation of NO to $NO_2$. While pure oxygen may be introduced into the reactor 10 for this purpose, economic considerations make the use of air clearly preferred in most applications. As described in more detail below, the reactor 10 is equipped with surface agitators 20 which throw sprays of aqueous reaction liquid upwardly into the overlying gas phase in the reactor 10, thereby providing a discontinuous liquid phase in the continuous gas phase which allows the regeneration of nitric acid to proceed. This aeration of the reaction liquid also promotes the reaction of NO and $O_2$ dissolved therein as well as the hydrolysis of $NO_2$ thus formed in solution.

While the nitric acid is nearly completely regenerated in this fashion within the reactor 10, the gas stream exiting the reactor 10 still contains minor amounts of NO and $NO_2$. To recover these nitrogen oxides, this exiting gas stream is passed through a scrubber 30 wherein it is subjected to a discontinuous phase preferably of aqueous calcium hydroxide causing the following reaction:

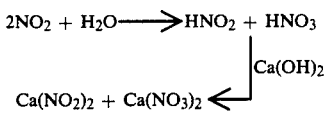

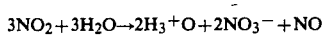

Of course, the presence of oxygen causes any NO to be oxidized to $NO_2$, and some NO may be generated by the dissociation of $NO_2$ in water:

$$3NO_2 + 3H_2O \rightarrow 2H_3{}^+O + 2NO_3{}^- + NO$$

The scrubber 30 is provided with sufficient stages to remove nitrogen oxides from the gas stream so that an environmentally acceptable concentration is obtained in the gas discharged from the scrubber 30 to the atmosphere.

The slurry exiting the reactor 10 contains silver and gold which have been released from the crystal structure of the feed ore stream. The released silver and gold can be recovered by conventional chemical leaching techniques. Additionally, those metal ions now is solution may be recovered by selective precipitation or other conventional processes.

At this point in the process there are a number of options available for manipulating the solid and liquid components comprising the slurry exiting from the reactor 10. The solid may be simply filtered and subjected to a conventional leaching process to recover the gold and silver now released from the refractory ore. However, to reduce the number of filtering steps in the process, it is preferred to filter the slurry after it has been subjected to sulfate precipitation as described below. The liquid component of the slurry contains nitric acid which should be recycled to the reactor 10, and it also contains sulfuric acid which must be removed before it reaches a concentration within the reactor 10 which would have a deleterious effect on the process chemistry or the process apparatus. The sulfuric acid can be removed as calcium sulfate or other insoluble compounds, and the nitric acid can be recovered for reuse in the reactor by introducing the oxidized ore slurry into a precipitator vessel 40 where it is contacted preferably with calcium ion from lime $(Ca(OH)_2)$ which may be derived from the liquid stream exiting the scrubber 30. This latter stream contains $Ca(NO_2)_2$ and $Ca(NO_3)_2$ as well as $Ca(OH)_2$ all in solution. The combination of the two streams in the vessel 40 causes the removal of calcium and sulfate ions as gypsums, $CaSO_4.2H_2O$, and the nitrite and nitrate ions are freed to reenter the nitric acid cycle. Clearly, conditions within the precipitator 40 must be maintained at low pH, i.e. 1–2, so that the nitrite and nitrate ions are released as $HNO_2$ an $HNO_3$.

While the preferred source of calcium ion is lime added to the process as needed, some refractory ores also contain significant amounts of $CaCO_3$ which will reduce the lime requirement for the precipitator 40. If the ore contains so much $CaCO_3$ that it will require an uneconomical amount of acid to neutralize it, it may be separated from the raw ore by an initial flotation concentration step and then used in the process for the precipitation of gypsum.

The air intake 41 for the process as shown in FIG. 1 is located at the end of the precipitator 40 opposite the liquid intake 44. Air flows from the precipitator 40 to the intake of the reactor 10 carrying with it any nitrogen oxides not recaptured as nitrous or nitric acid in the precipitator 40. Thus, the air flow for the system in which the process of the invention is carried out runs through the precipitator 40, the reactor 10 and finally, the scrubber 30 back to the atmosphere. The reactor 10, scrubber 30 and precipitator 40 are all covered or closed vessels so that nitrogen oxides cannot escape the system. However, it should be understood that these covered vessels are not normally pressurized, but operate under the ambient pressures associated with the gas circulation therethrough and the heat of the reactions associated therewith. It should be understood that the process of the invention includes pressurized as well as ambient pressure conditions. Because the nature of ores varies widely, it may be deemed desirable in certain situations to use pressurized vessels in the process of the inventiom. However, it is normally thought to be an advantage of the present invention that the process can be carried out at ambient pressure.

At this stage of the process, the acidic slurry now containing precipitated gypsum as well as the oxidized ore, can be removed from the precipitator 40 and the acidic liquid separated from the solids at a filter 55. The liquid filtrate is recycled to the intake of the reactor 10 at which point additional nitric acid may be added.

It may be desirable to recover metallic cations solubilized by the oxidation process. Such metals of interest may include zinc, cobalt, nickel or even copper. In order to recover these cations, a portion of the liquid exiting the filter 55 is diverted to a second precipitator 60. The precipitator 60 comprises a series of stages wherein the pH of the filtrate is raised preferably by the addition of lime $(Ca(OH)_2)$. The rising pH in the precipitator 60 causes the selective precipitation of various metallic cations generally as the hydroxides and oxides thereof. The recovery of those compounds of interest from the precipitator 60 is accomplished at a filter 70 and the filtrate is used to charge the scrubber 30, or the filtrate can be subjected to further pH adjustment in a second or more such precipitators 60 and filters 70 until the pH is maximized by the lime.

Preparatory to a conventional cyanide leach process, the filtered solids from the gypsum precipitator 40 are resuspended as a slurry in water, and alkali is added in a mixing vessel 80 to adjust the pH. The slurry can be passed through a filter 90 and the solids then subjected to a conventional cyanide process for extracting the gold and silver therefrom.

The filtrate from the filter 90 is combined with the filtrate from the filter 70 for use in the scrubber 30. Thus, it can be seen that lime, $Ca(OH)_2$, is consumed and gypsum, $CaSO_4.2H_2O$, is produced in the process. Nitric acid is lost only gradually so that the cost of adding concentrated nitric acid to maintain the continuity of the process is minimized.

While a general understanding of the process of the invention may be had from the foregoing description, details of the preferred apparatus will now be described with reference to FIGS. 2–6.

Figure 2:
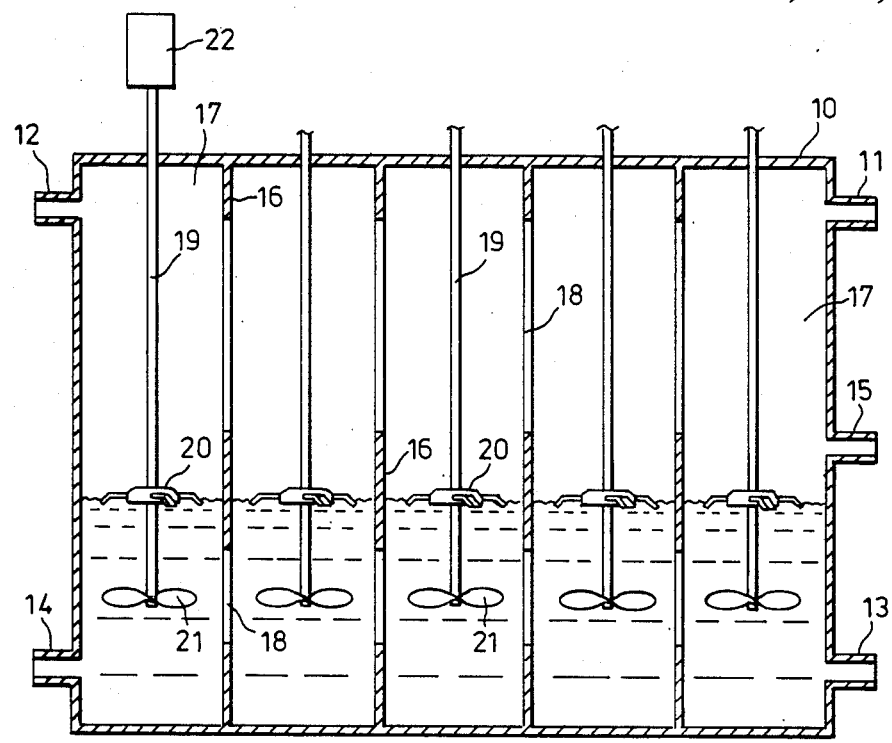
FIGS. 2 through 6 are schematic representations showing some structural details of the preferred apparatus employed in the overall process shown in FIG. 1.

Referring to FIG. 2, the reactor 10 comprises a closed vessel having an inlet 11 and outlet 12 for the gas phase and an inlet 13 for the nitric acid containing solution and an outlet 14 for the ore slurry. Untreated ore or concentrate in powdered or slurry form is introduced into the intake end of the reactor 10 at an inlet 15. The reactor 10 is divided by partitions 16 into a plurality of cells 17 which communicate with adjacent cells 17 via apertures 18 therein. The apertures 18 are located in both the liquid and gas containing portions of the reactor 10 and are sized and positioned so as to promote the desired path and rate of flow for the fluids therethrough. Each partition 16 may have one or several apertures 18 governing the flow of each phase. Normally the apertures 18 comprise slots positioned centrally in the partition 16 and do not usually extend across the full width of the partition 16.

Each cell 17 is provided with a means for agitating the slurry therein. Each such agitator preferably comprises a shaft 19 having a liquid surface impeller 20 and a subsurface impeller 21. Each shaft 19 passes through a sealed opening in the top of each cell 17 and is connected to a motor 22.

The optimum liquid level in the reactor 10 will depend on a number of factors including the reactivity of the ore with nitric acid. Generally, the reactor 10 will have a liquid level between $\frac{1}{4}$ and $\frac{1}{2}$ the height thereof. The number of cells 17 will also depend on the oxygen demand requirement of the ore being oxidized for release of the metal of interest. Generally, the flow of slurry through the reactor 10 is relatively slow, being on the order of one to 24 hours for 5 to 7 cells, while the gas flow through the reactor 10 is much faster, being generally on the order of 5 minutes. These relative flow rates through the reactor 10 stem from the initially high rate of nitric acid consumption with concurrent evolution of NO an $NO_2$ gas. A steady flow of oxygen is needed to convert the NO produced to $NO_2$, and a steady contacting of the $NO_2$ with water is required to regenerate $HNO_3$. This latter step is accomplished in each cell 17 of the reactor 10 by means of the surface impeller 20. The impeller 20 is preferably of the type commercially available from Prochem Limited of Brampton, Ontario and comprises an impeller having cambered hydrofoil blades 22 for minimum energy loss due to drag and maximum lift, thrust and pumping action for the liquid phase. The pitch and number of blades 22 determines the surface agitation characteristics most suitable for the present application. The impeller 20 provides superior gas-liquid contacting within each cell 17 by causing the insertion of liquid droplets as a discontinuous phase in the continuous gas phase. The formation of nitrous and nitric acids is much more efficiently accomplished using this agitation format than would be the case if the $NO_2$ containing gas were bubbled through the aqueous phase. The preferred mode of surface agitation described provides a thorough aeration of the liquid in each cell 17. It is felt that this aeration causes substantial oxidation of NO to $NO_2$ in the liquid phase since both NO and $NO_2$ are highly solubilized by virtue of this agitation.

Figure 3:
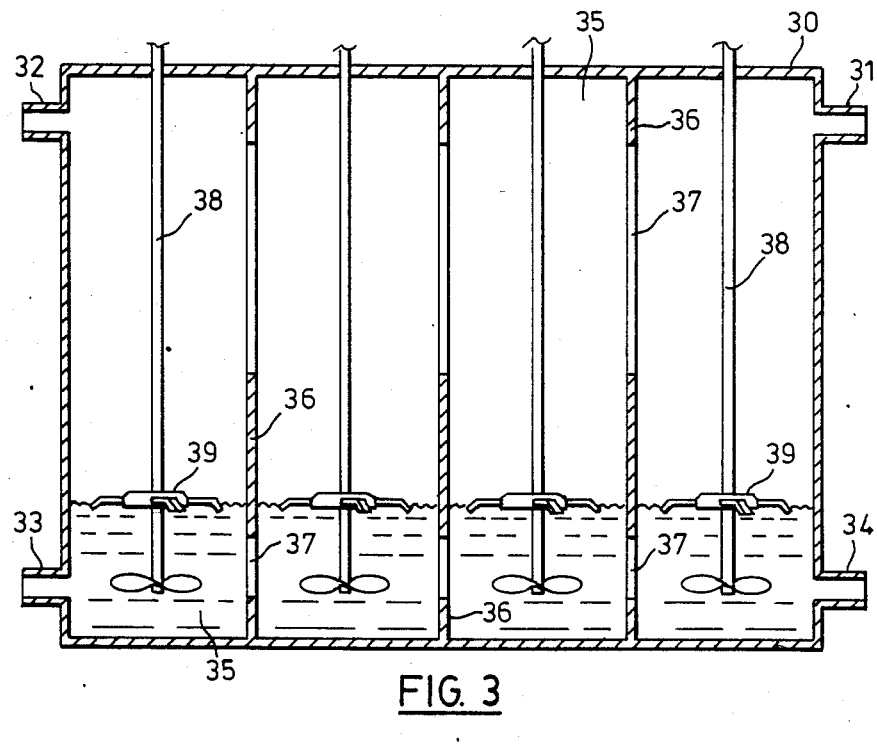

While regeneration of nitric acid from NO and $NO_2$ within the reactor 10 is usually greater than 98% efficient for a process having a cocurrent flow of gas and slurry phases therethrough, the gas exiting the reactor 10 at the outlet 12 may contain environmentally unacceptable levels of $NO_2$ and NO. Under these circumstances, the gas is passed through a scrubber 30 prior to being discharged to the atmosphere. As shown in FIG. 3, the scrubber 30 is a closed vessel having a gas inlet 31 and outlet 32 as well as a liquid inlet 33 and outlet 34 at opposite ends thereof. In the preferred embodiment described herein, the liquid and gas flows in the scrubber 30 are countercurrent to one another, but other process designs may differ in this respect. The scrubber 30 is divided into a plurality of cells 35 by partitions 36 having apertures 37 therein to allow the gas and liquid to flow therethrough in the desired fashion. Each cell 35 is provided with a sealed surface agitator 38 each having an impeller 39 as described previously.

As discussed above, the scrubber 30 is provided with an inflowing stream of aqueous lime ($Ca(OH)_2$) at a pH of about 11. Contacting this lime solution with the $NO_2$ containing gas flowing through the cells 35 of the scrubber 30 efficiently removes the $NO_2$ by hydrolyzing it to nitrous and nitric acids which are neutralized by the calcium hydroxide as calcium nitrite and calcium nitrate in solution.

Figure 4:
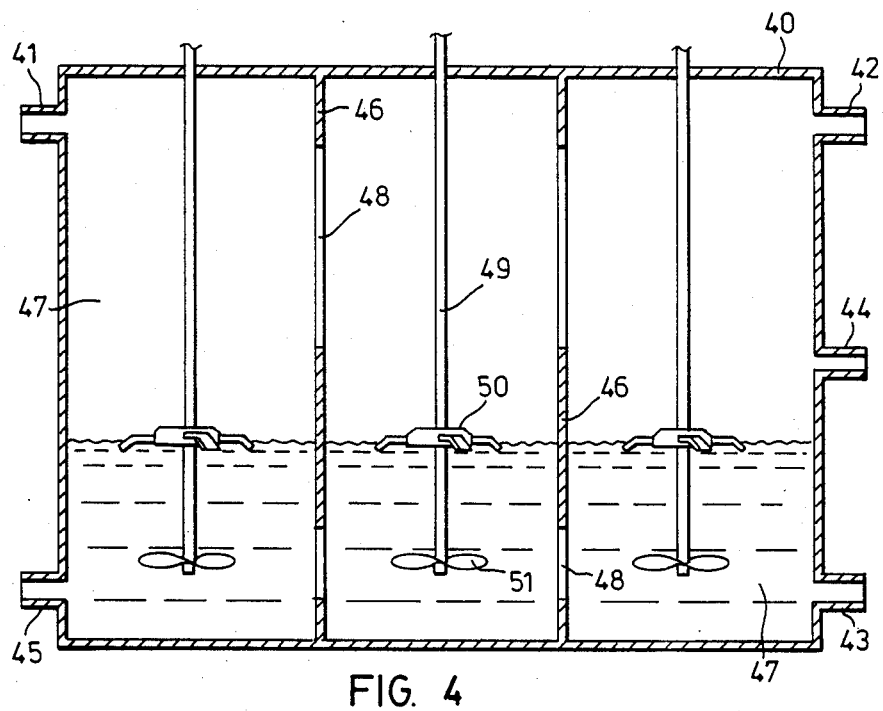
Figure 5:
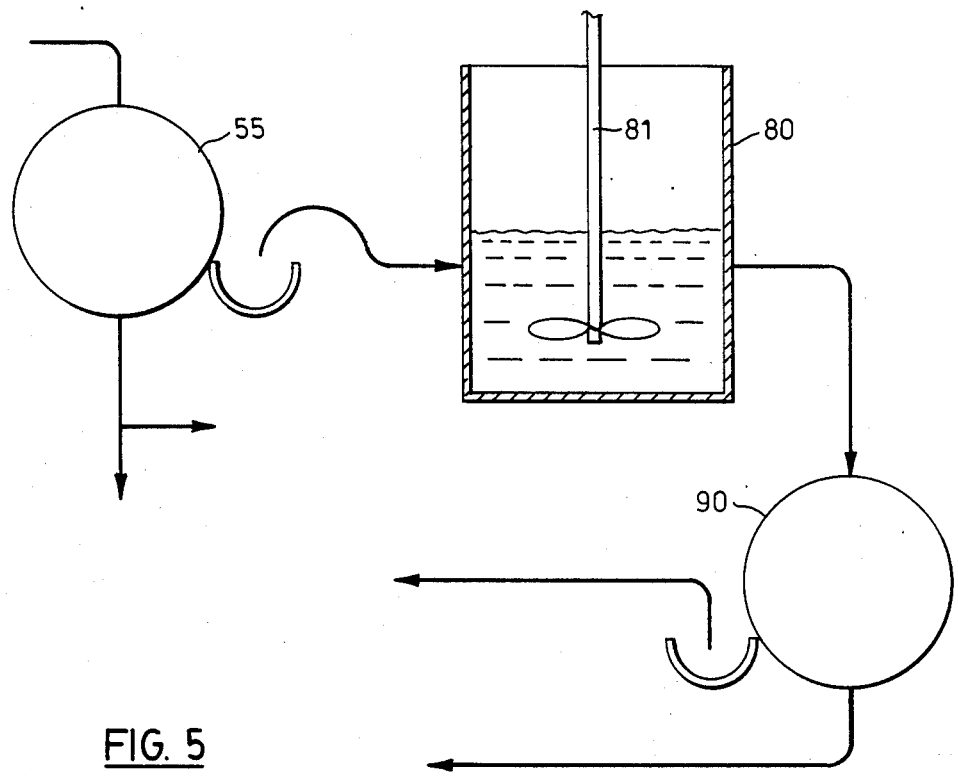

The basic liquid flow from the outlet 34 of the scrubber 30 is mixed with the acidic slurry discharged from the reactor 10 in the precipitator 40 (FIG. 4). The precipitator 40 comprises a closed vessel like the reactor 10 having an inlet 41 and outlet 42 for gas circulating therethrough, and inlets 43 and 44 for the liquid and slurry flows from the scrubber 30 and reactor 10 as well as an outlet 45 for the slurry exiting the precipitator 40.

Like the reactor 10, the precipitator 40 has a plurality of partitions 46 positioned within it which define a series of cells 47. The partitions have apertures 48 to allow the flow of gas and liquid to proceed through the precipitator 40 from cell to cell. The gas-liquid flow in the precipitator 40 is countercurrent in the process being described. Each cell 47 is equipped with a sealed agitator 49 having both a surface impeller 50 and subsurface impeller 51. As in the reactor 10, these impellers serve to maintain the slurry dispersion and to promote hydrolysis of any $NO_2$ in the gas phase.

As mentioned above, the precipitator 40 provides the air intake 41 for the system, the air flow passing from the outlet 42 to the inlet 11 of the reactor 10. The precipitator 40 is also a key component in the overall scheme of nitric acid regeneration for the process. Here, the unwanted calcium and sulfate ions are removed from the system as gypsum precipitate ($CaSO_4.2H_2O$). By maintaining acidic conditions, preferably near pH 1, in the precipitator 40, nitrite and nitrate are released as nitrous and nitric acid. By aerating the liquid in the precipitator 40 by means of the surface impellers 50, the nitric acid cycle is promoted, that is, nitrous acid is oxidized to nitric acid.

The slurry exiting the precipitator 40 can contain particles of sulfur, gypsum, precious metals such as gold and silver, and gangue, and the liquid portion comprises aqueous nitric acid having various metallic cations dissolved therein. This slurry is conveyed to a conventional continuous filter 55 (FIG. 5) from which the filtrate is introduced into the reactor 10 at the liquid inlet 13, and the solid filter cake is transferred to a mixing vessel 80 equipped with an agitator 81 where it is suspended in water and lime is added to adjust the pH to about 11 in preparation for conventional cyanide leaching. It has been found that the temperature used to condition the slurry in the mixing vessel 80 sometimes has an affect on the recovery of gold and silver in the subsequent leaching step. Thus, the temperature in the mixing vessel 80 may be maintained between ambient and 100° C. A second filtration step at the filter 90 removes the lime solution for use in the scrubber 30, and the filtered solids can then be introduced to a conventional cyanide leach circuit for removal of the gold and silver therefrom.

As explained above, metallic cations may be recovered from the filtrate exiting the filter 55 by selective precipitation. Thus, a portion of the liquid stream from the filter 55 can be diverted to a second precipitator 60

Figure 6:
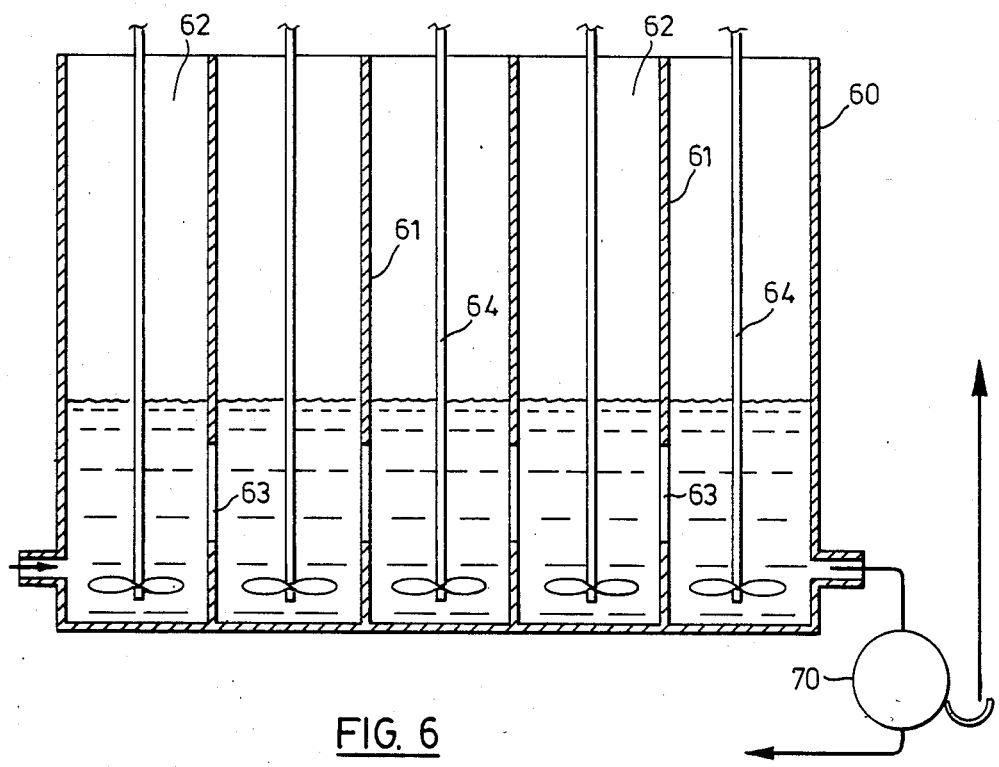

(FIG. 6). The precipitator 60 comprises a vessel, which may be open, having a plurality of partitions 61 defining cells 62 therein. Apertures 63 are provided in the partitions 61 to allow the liquid to flow from cell to cell. Agitators 64 are provided in each cell 62 to give thorough mixing to the liquid or slurry contained therein. Lime can be continuously added to each cell 62 as the liquid moves through the precipitator 60 or it can be added into the first cell 62 to raise the pH of the liquid to the desired value. As the pH increases in the liquid, cationic species will selectively precipitate out generally as the hydroxide or oxide. The precipitates of interest may be selectively removed at the filter 70, and the filtrate can be subjected to further pH adjustment in additional precipitators 60 to recover other metal values of interest. Ultimately, the filtrate from a filter 70 is added to the liquid flow through the scrubber 30.

The foregoing description relates to a preferred embodiment which enables the operator to choose among a number of options for processing the particular ore in question. It will be apparent to the skilled person that the described process and apparatus can be simplified where the availability of the various options afforded thereby are of no particular interest.

Figure 7:
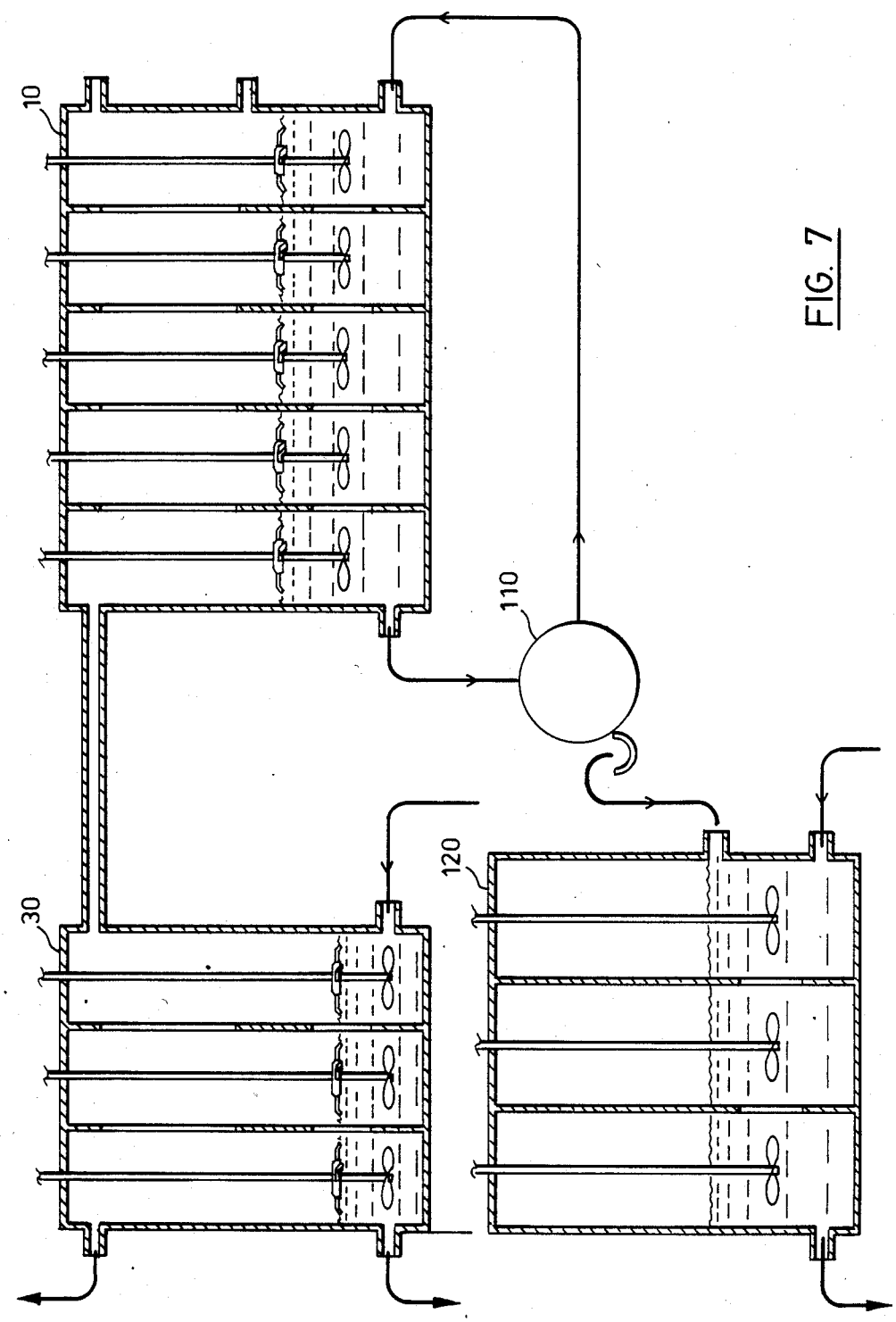
FIG. 7 is a schematic representation of a simplified process in accordance with the invention.

For example, FIG. 7 shows a schematic representation of a simplified process in accordance with the present invention which may be used when it is only desired to recover gold from a refractory ore. The crushed ore is oxidized in a reactor 10 as previously described. The gas phase exiting the reactor is passed through a scrubber 30, and the ore slurry is filtered at a continuous filter 110. The filtrate from the filter 110 is recycled to the reactor 10 and the solid is transferred to a vessel 120 where it is conditioned in an aqueous lime solution preparatory to a cyanide leaching process. The conditioning in the vessel 120 may be carried out from ambient temperature to about 100° C. near pH 11.

While the foregoing description has related to a continuous process wherein the various gas and liquid streams are described as flowing in a particular fashion relative to one another, it should be appreciated that the invention is of a more general scope. Thus, the fluid flows in the reaction vessel 10 may be countercurrent to one another, and this may be preferred in certain applications. Also, the invention includes the oxidation step or any of the other described process steps when carried out in a batch-wise fashion. These and other variations of the process of the invention which would be apparent to one skilled in this art are meant to be included in the scope of the invention as defined in the following claims.

I claim:
1. A process for oxidizing an ore, comprising:
continuously reacting the crushed ore suspended as a slurry in aqueous nitric acid in the presence of oxygen, thereby oxidizing the ore and generating nitrogen oxides, wherein the crushed ore and aqueous nitric acid are continuously introduced into a first end of a covered reaction vessel, and oxygen is continuously introduced into the vessel and gas is continuously removed therefrom, said vessel having a plurality of internal partitions spaced from one another defining a plurality of cells within the vessel, said partitions having apertures therein providing a pathway for the flow of the gas and slurry phases through the vessel, and each cell having means for agitating the slurry;

continuously agitating the slurry in each cell to maintain the ore particles in suspension in the aqueous acid and to provide a discontinuous liquid phase in the nitrogen oxides containing gas flowing therethrough, so that nitric acid is regenerated;
flowing the slurry and gas phases through the reaction vessel from cell to cell at rates which allow the ore to be sufficiently oxidized to enable the recovery of the metal of interest by conventional means; and
continuously removing slurry from a second end of the vessel.

2. A process as claimed in claim 1, wherein the ore is refractory.

3. A process as claimed in claim 1, wherein oxygen is introduced into the reaction vessel as air.

4. A process as claimed in claim 1, wherein there is more than one metal of interest to be recovered from the ore.

5. A process as claimed in claim 1, wherein the metal of interest is gold.

6. A process as claimed in claim 1, wherein he means for agitating the slurry comprises an impeller mounted on a rotatable shaft.

7. A process as claimed in claim 1, wherein the discontinuous liquid phase is provided by surface agitation means in each cell.

8. A process as claimed in claim 7, wherein the surface agitation means comprises an impeller mounted on a rotatable shaft, said impeller being positioned at the surface of the slurry.

9. A process as claimed in claim 8, wherein the impeller has a plurality of cambered hydrofoil blades which provide lift, thrust and pumping action for the aqueous phase.

10. A process as claimed in claim 1, wherein the ore is sulfidic and further comprising treating the slurry removed from the reaction vessel to remove a substantial portion of sulfate contained therein, separating the oxidized ore from the liquid, and reintroducing the liquid into the first end of the reaction vessel.

11. A process as claimed in claim 10, wherein the sulfate is removed from said slurry by precipitation.

12. A process as claimed in claim 11, wherein said precipitation is effected by the addition of calcium ion to the slurry.

13. A process as claimed in claim 1, further comprising, passing the gas removed from the reaction vessel through a scrubber to remove substantially all nitrogen oxides contained therein.

14. A process as claimed in claim 13, wherein the scrubber comprises a vessel containing an aqueous medium being agitated so as to provide a discontinuous liquid phase in the continuous gas phase flowing therethrough.

15. A process as claimed in claim 10, wherein the slurry removed from the reaction vessel is passed through a precipitation vessel in which the slurry is mixed with an agent which causes precipitation of a substantial portion of the sulfate contained therein.

16. A process as claimed in claim 15, wherein the agent is calcium hydroxide.

17. A process as claimed in claim 10, further comprising, removing at least a portion of the metal cations from at least a portion of the substantially sulfate free liquid phase by adjusting the pH thereof to cause precipitation of compounds containing said metal cations.

18. A process as claimed in claim 1, wherein the gas and slurry phases flow through the reaction vessel cocurrently.

19. A process as claimed in claim 18, wherein the rate of gas flow through the reaction vessel is at least ten times greater than the rate of slurry flow therethrough.

20. A process as claimed in claim 1, wherein the gas and slurry phases flow through the reaction vessel countercurrently.

21. A process as claimed in claim 1, wherein the conventional means for recovery of the metal of interest comprises chemical leaching.

22. A process as claimed in claim 10, further comprising conditioning the oxidized ore as a slurry in aqueous liquid having a pH of from 10 to 12.

23. A process as claimed in claim 22, wherein the conditioning is conducted at a temperature from 25° to 100° C.

24. A process as claimed in claim 23, wherein the temperature is about 80° C.

25. A process as claimed in claim 1, wherein the oxidation is conducted at a temperature from ambient to about 80° C.

26. A process as claimed in claim 1, wherein the oxidation is conducted at ambient pressure.

27. A process as claimed in claim 1, wherein the metal of interest is one or more of the following: gold, silver, cobalt, nickel, copper, zinc, uranium, tungsten or molybdenum.

28. A process as claimed in claim 1, wherein the metal of interest is one or more of the following: gold, silver, cobalt, uranium, zinc or tungsten.

* * * * *